(12) United States Patent
Furuichi et al.

(10) Patent No.: US 6,805,496 B2
(45) Date of Patent: Oct. 19, 2004

(54) OPTICAL COMMUNICATION MODULE, MANUFACTURING METHOD THEREOF AND WAVELENGTH SELECTIVE FILTER

(75) Inventors: Hiroaki Furuichi, Yokohama (JP); Kazumi Kawamoto, Yokohama (JP); Katsumi Kuroguchi, Yokohama (JP); Keiichi Yamada, Yokohama (JP); Shintarou Sakamoto, Fujisawa (JP)

(73) Assignee: OpNext Japan, Inc., Tokyo (JP)

( * ) Notice: Subject to any disclaimer, the term of this patent is extended or adjusted under 35 U.S.C. 154(b) by 42 days.

(21) Appl. No.: 10/052,739

(22) Filed: Jan. 17, 2002

(65) Prior Publication Data

US 2003/0072542 A1 Apr. 17, 2003

(30) Foreign Application Priority Data

Oct. 17, 2001 (JP) .......................................... 2001-319028

(51) Int. Cl.⁷ ................................................ G02B 6/36
(52) U.S. Cl. ............................................ 385/93; 385/52
(58) Field of Search ................................ 385/93, 8, 14, 385/31, 33, 39, 52

(56) References Cited

U.S. PATENT DOCUMENTS 5,130,998 A * 7/1992 Wakata et al. ................. 372/32
6,157,025 A * 12/2000 Katagiri et al. ................ 250/26
6,400,739 B1 * 6/2002 Auracher ...................... 372/32
6,532,059 B2 * 3/2003 Shirai et al. ................ 356/3.04
6,539,145 B1 * 3/2003 Auracher et al. .............. 385/24
6,583,873 B1 * 6/2003 Goncharov et al. .......... 356/326
2001/0022793 A1 * 9/2001 Yokoyama ................ 372/29.02

FOREIGN PATENT DOCUMENTS

| JP | 10-079723 | 3/1998 | |
| JP | 2000-223747 | 8/2000 | |
| JP | 2001257419 A | * 9/2001 | ......... H01S/5/0683 |

* cited by examiner

Primary Examiner—Frank G. Font
Assistant Examiner—Kevin C Kianni
(74) Attorney, Agent, or Firm—Townsend and Townsend and Crew LLP (57) ABSTRACT

The incident angle of the beam with regard to an etalon is arranged finely tunable by either rotating the etalon provided with a plane of incidence inclined with regard to the rotational axis thereof in the vicinity of the optical axis or rotating a lens whose edge surface is obliquely ground around the optical axis, which allows the incident angle of the laser beam with regard to the etalon to be adjusted and fixed with high precision.

15 Claims, 9 Drawing Sheets

OPTICAL COMMUNICATION MODULE, MANUFACTURING METHOD THEREOF AND WAVELENGTH SELECTIVE FILTER

FIELD OF THE INVENTION

The present invention relates to optical communication module and the manufacturing method thereof.

DESCRIPTION OF THE RELATED ART

In recent years, the larger volume of transmission is anxiously demanded for optical fiber communication. Thus, wavelength multiplexing optical communication system is put into practice to transmit a plurality of lights having different wavelength through the sole optical fiber so as to enlarge the volume of transmission. The wavelengths used for that purpose are restricted within the band of 1.3 µm or 1.55 µm, which means that the narrowing of an interval between the adjacent wavelengths leads to the increase of the number of wavelengths that can be transmitted. The wavelengths in use are standardized as an ITU grid by the recommendation of ITU (International Telecommunication Union), the frequency interval or spacing of which wavelengths tends to become narrower from 200 GHz via 100 GHz to 50 GHz, which correspond to 1.6 nm, 0.8 nm and 0.4 nm in terms of wavelength intervals. It requires a highly precise stabilization of the respective wavelengths to narrow the wavelength intervals, which leads to the demand for an optical communication module as a luminous source for stabilizing an oscillating wavelength of a semiconductor laser.

In respect of the optical communication module to stabilize the oscillating wavelength of the semiconductor laser, there are some prior methods for monitoring and stabilizing the wavelengths. Especially, an etalon filter (etalon) having repetitive wavelength selectivity is advantageous for detecting the plurality of different wavelengths by means of the sole etalon, which use is prevailing. There is a disclosure relevant to the method for detecting and stabilizing wavelengths in Japanese Patent Application Laid-open No. Hei 10-079723 entitled "Wavelength Monitoring and Controlling Apparatus for Wavelength Segmenting Multiplex Optical Transmission System", in which the laser beam diffused by a lens is diagonally emitted to an etalon, and the difference in transmitted quantity of light between two separate places respectively having different incident angle is detected by a photodiode.

As for an example of the method for rendering the laser beam parallel light and divide the same light into two parts by means of a beam splitter, one of which parts is practically vertically emitted with regard to an etalon, so as to detect and stabilize wavelengths, there is a prior disclosure described in the presentation entitled "Wavelength Detecting Section Integrated Tunable LD Module" at the General Convention C-3-143 of Electronics, Information and Communication Academy in May 2000. Then, in the Japanese Patent Application Laid-open No.2000-223747 entitled "Light Emitting Device", it is disclosed that only a portion of the laser beam is emitted to an etalon without using the beam splitter.

Further, in the Japanese Patent Application Laid-open No. Hei 10-079723 as described above, it is disclosed that the etalon swings to the horizontal direction with regard to the substrate.

It is for sure that the utilization of the repetitive wavelength selectivity of the etalon allows the sole etalon to detect the plurality of different wavelengths, but it requires a highly precise adjustment and fixing of the incident angle of the beam with regard to the etalon to detect the change in the vicinity of a particular wavelength.

As an example of the method for adjusting the incident angle of the laser with regard to the etalon, the method for swinging the laser beam to the horizontal direction with regard to the substrate is disclosed in the Japanese Patent Application Laid-open No. Hei 10-079723, but it is insufficient to prevent the transmitted quantity of light of the laser from decreasing in light of the characteristics of the etalon, in the event where the incident angle of the laser with regard to the laser becomes larger.

Thus, for any of the foregoing prior disclosures, it requires to highly precisely adjust and fix the incident angle of the etalon by swinging the etalon in the vicinity of the vertical incident angle thereof.

SUMMARY OF THE INVENTION

The present invention is to provide a technical solution to finely tune the incident angle of the laser with regard to the etalon.

The present invention is also to provide optical communication module capable of highly precisely adjusting the incident angle of the laser with regard to the etalon for the detection of the plurality of different wavelengths by means of the repetitive selectivity of the etalon.

The first embodiment of the present invention relates to optical communication module comprising a semiconductor laser, a lens converting the beam emitted from the laser, a wavelength selective filter for the laser beam as converted and a light receiving device of the beam transmitted through the filter, wherein the filter is cylindrical in shape and provided with a plane of incidence and a plane of emission substantially parallel to each other, the slope of which plane of incidence has an angle excepting 0 degree with regard to the central axis of the cylinder.

The use of such cylindrical filter as above that revolves around the central axis thereof allows the transmitted quantity of light of the etalon to be adjusted, which facilitates the transmitted quantity of light of the etalon with respect to a particular wavelength to be set at a target value.

The second embodiment hereof relates to optical communication module comprising a semiconductor laser, a lens converting the beam emitted from the laser, a wavelength selective filter of the beam as converted and a light receiving device of the beam transmitted through the filter, wherein the filter is provided with a plane of incidence and a plane of emission substantially parallel to each other and at least one lateral plane between those two planes, which filter is fixed onto the substrate so that there is an angle above 0 degree between the lateral plane and the substrate.

The present invention allows the filter to be positioned at the lateral plane at one time and to be further rotated, which facilitates the transmitted quantity of light of the etalon to be adjusted.

Further, providing that a holding member to hold an angle is provided for stabilization between the lateral plane of the filter and the substrate, it prevents the augmented transmitted quantity of light of the etalon from fluctuating.

The filter may be fixed on the substrate by soldering, but the metallization of the lateral plane surface improves the adhesion between the solder and the filter.

Further, the formation of the plurality of the lateral planes allows the filter to be fixed at any one of such planes, which enables the transmission characteristics of the filter to be stepwise controlled.

Moreover, the adjoining disposition of the lateral planes allows the transmission characteristics of the filter to change in a continuous and stepwise manner.

Also, the markings on the filter allow the transmission characteristics of the etalon in each direction of the filter to be grasped, which markings turn to become reference points to change the transmission characteristics thereof through the revolution of the filter so as to facilitate the fixing of the same on the substrate.

In turn, upon the disposition of the filter on the substrate, the markings on the substrate to position the filter thereon allow the counterpart markings or uneven surface of the filter to go aligned to each other, which also facilitates the filter to be fixed on the substrate.

Providing that a filter is produced such that it is disposed on the optical communication module by displacing by a first angle the slope of the plane of incidence of the filter with regard to the optical axis of the beam and rotating the filter around an axis with a second angle different from the first angle, it facilitates the characteristics of the filter to change upon its disposition on the substrate.

Further, provided that the filter is rotated around the central axis of the beam emitted from the semiconductor laser or parallelwise to the central axis, it allows more preferred transmission characteristics of the filter to be selected.

Then, provided that the center of a lens is offset vertically with regard to the central axis of the beam, it allows more preferred transmission characteristics of the filter to be obtained.

Differently from the embodiments as described above, another embodiment relates to an optical communication module comprising a semiconductor laser, a lens converting the beam emitted from the laser, a wavelength selective filter of the beam as converted and a light receiving device of the beam transmitted through the filter, wherein the plane of emission of the lens is inclined from the vertical direction with regard to the rotational axis of the filter.

This embodiment allows the transmission characteristics of the filter to easily change, which facilitates the transmitted quantity of light of the etalon to be set at a target value.

Further, a portion of the beam as converted is through the wavelength selective filter received into a light receiving device while the remaining portion thereof is received into another light receiving device so as to perform monitoring on wavelengths, which allows the disposition of the respective structural members to be controlled so as to adjust the transmitted quantity of light of the filter.

Further, differently from the embodiments as mentioned above, another embodiment relates to an optical communication module comprising a semiconductor laser, a lens converting the beam emitted from the laser, a wedge substrate converting the direction of the beam as converted, a wavelength selective filter of the beam as converted and a light receiving device receiving the beam transmitted through the filter, wherein the plane of emission of the wedge substrate is inclined from the vertical direction with regard to the rotational axis of the filter, which substrate rotates around the optical axis of the beam.

This embodiment also facilitates the transmitted quantity of light of the filter to be easily adjusted.

To note, it is preferred to use a wedge substrate, on the plane of incidence of which substrate a semi-transparent film is attached.

When a wavelength selective filter that transmits a portion of light wavelengths, which filter is provided with a plane inclined with regard to the central axis of a cylinder and a metallized portion along the circumferential portion of the cylinder that allows for spot welding by laser beam, is adopted for the filter of the optical communication module, it facilitates the transmission characteristics of the filter to be easily adjusted.

When a method for producing a wavelength selective filter provided with a plane inclined with regard to the central axis of the cylinder and transmitting a portion of light wavelengths, along the outer circumference of which cylinder a metallized portion for soldering is provided, is put to practical use, it facilitates the transmission characteristics of the filter to be easily adjusted.

Those and other objects, features and advantages of the invention will be apparent from the following more particular description of preferred embodiments of the invention, as illustrated in the accompanying drawings.

DESCRIPTION OF THE PREFERRED EMBODIMENTS

Hereinafter, the preferred embodiments of the present invention are described below with reference to the accompanying drawings.

To begin with, the arrangement and operation of the whole optical communication module putting an etalon to use is described with reference to FIG. 1.

Figure 1:
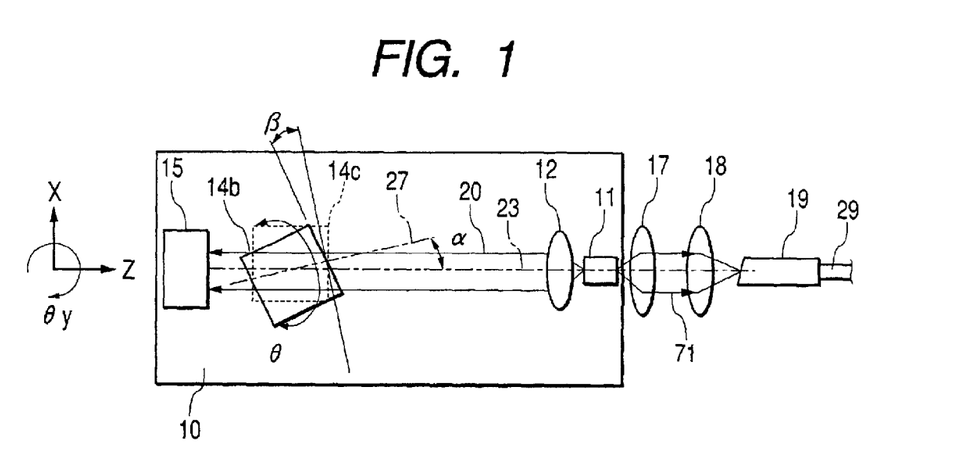
FIG. 1 is a plan view of the optical communication module according to the first embodiment of the present invention.

FIG. 1 is a plan view to show the first embodiment of the optical communication module according to the present invention. The light emitted forwards from a semiconductor laser 11 turns to become parallel beams 71 at a first lens 17, which beams are penetrated through an isolator and so forth not shown in the drawing and converged at a second lens 18 so as to be transmitted into a fiber 29 situated at the center of an edge surface of an optical fiber ferrule 19 for communication purposes. A wavelength monitoring optical system is provided behind the semiconductor laser 11 so as to stabilize the quantity of light and the wavelengths thereof. In the drawings as shown below, the optical system put forwards in the module that is irrelevant to the present invention is omitted.

Figure 2:
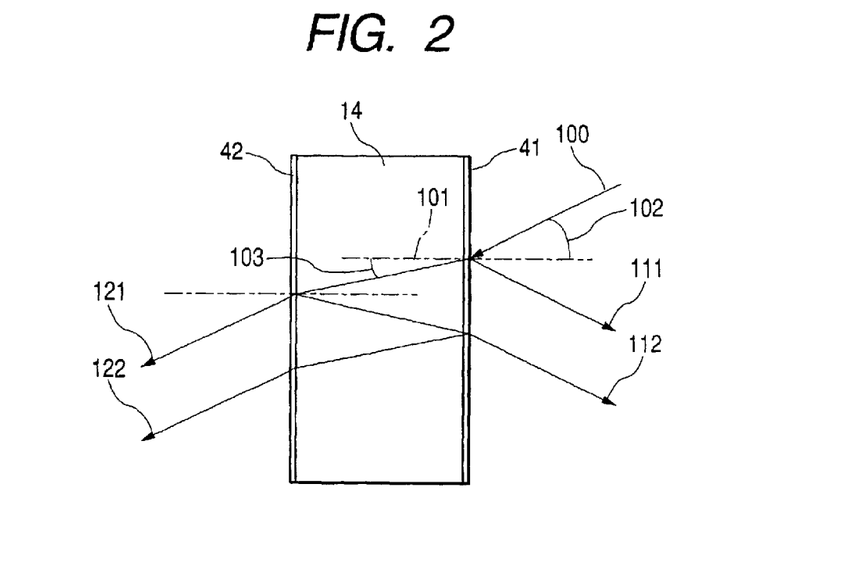
FIG. 2 is a side view of an etalon to show the state where the beam has penetrated into the etalon.

The wavelength monitoring optical system is mounted onto a substrate 10 by soldering, welding or adhering along with the positioning of the structural members thereof on the substrate. The laser beam emitted backwards from the laser 11 turns to become a parallel beam 20 at a lens 12. The beam 20 transmits through an etalon 14b, which beam is penetrated into a first light receiving device 15 that detects wavelength fluctuation. Here, the characteristics of the etalon are described as follows. FIG. 2 is a side view of the etalon to show the state upon the penetration of the light into the etalon. As shown in the drawing, the etalon 14 is of high parallelism and flatness and a parallel plate made from an optical glass or quartz glass, etc., both sides of which plate consist of semitransparent films 41 and 42. The penetrated beam 100, according to the ratio of the transmittivity of the semitransparent film 41 to the reflectivity thereof as determined by the reflection factor r of the film, is split into a first reflective beam 111 and a beam transmitting through the inside of the etalon while being divided into a portion of the beam reflected by the semitransparent film 42 and a first transmission beam 121 emitted from the etalon. The establishment of the beam incident angle 102 to the etalon incidence right-angle axis 101 and the refractive index of the etalon leads to a given beam refraction angle 103 according to Snell's law. The reflection and transmission of the penetrated beam as mentioned above are repeated in the same manner as the first reflective beam 111 against the first transmission beam 121 and the second reflective beam 112 against the second transmission beam 122 at both edge surfaces of the etalon. A number of wave fronts generated in this way interfere with one another so as to form a Fabry-Perot interferometer, which turns to become a filter of wavelength selective transmission type.

Figure 3:
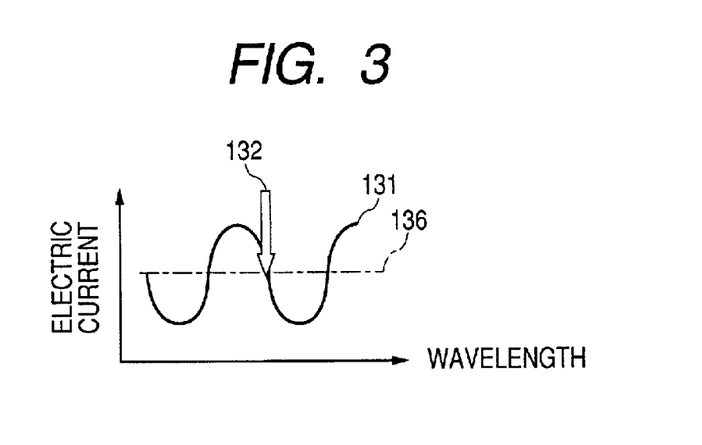
FIG. 3 is a diagram to show the electric current characteristics to the wavelength of the light beam transmitting through the etalon, which beam is received in the light receiving device.

The quantity of light transmitted through the etalon is detected at a first light receiving device 15, which device has such characteristics as shown in FIG. 3.

FIG. 3 is a diagram to show the electric current characteristics of the light receiving device against the wavelengths of the light beam that transmits through the etalon and is received in the same device, the horizontal axis of which shows wavelengths while the vertical axis of which shows the electric current. The light beam is received in the first light receiving device 15, the quantity of which light is converted into electric current. As shown in the drawing, an electric current curve 131 with a repetition of peaks at a certain interval between adjacent wavelengths is defined against the fluctuation of wavelengths of the beam that is received in the first light receiving device 15. Thus, it allows a wavelength fluctuation to be monitored in the vicinity of wavelength, the stabilization of which is expected for, for example, at a locking point of wavelength 132. To note, reference numeral 136 indicates an average electric current, in the vicinity of which current it is preferred to lock and monitor wavelength.

Here, the transmission characteristics of the etalon are further described as follows. The interval between repeated peaks is generally determined by the refractive index of a material for the etalon and the thickness of the parallel plate thereof. The etalon having a frequency interval of 50 GHz, the interval between repeated peaks of which is larger in transmission loss and stricter in the precision of the incident angle of beam than that having a frequency interval of 200 GHz and 100 GHz, is described below with reference to FIG. 4.

Figure 4:
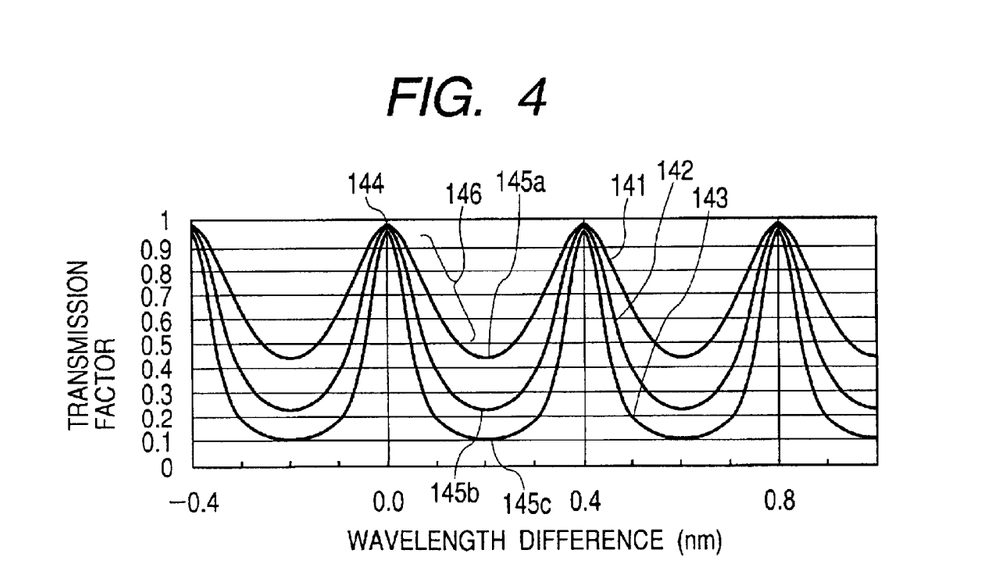
FIG. 4 is a diagram to show the relation between the wavelength of the light beam penetrating into the etalon and the transmittivity thereof.

FIG. 4 is a diagram to show the relation between the wavelength and the transmitivity of the light beam that transmits through the etalon, the horizontal axis of which shows wavelength difference (nm) while the vertical axis of which shows transmitivity. This diagram is based on the condition that the film reflection factor of the etalon changes from 20% via 35% to 50% provided that the ideal parallel light has penetrated into the etalon with right angle. The curve 141 corresponds to the computed value resulting from the film reflection factor 20%, and the curve 142 corresponds to the computed value resulting from the film reflection factor 35% while the curve 143 corresponding to the computed value resulting from the reflection factor 50%. As for the etalon having a frequency interval of 50 GHz, the peak are repeated at the interval of 0.4 nm, and it is found that the larger the film reflection factor becomes, the smaller a bottom corresponding to the minimum value of transmittivity becomes.

As for the control of wavelength, it is supposed herein that feedback operation is performed in the vicinity of the middle of a straight portion 146 between a peak 144 and a bottom 145a, 145b or 145c such that transmittivity or the quantity of light (electric current 131 as shown in FIG. 3) transmitting through the etalon becomes constant. The wider the wavelength range covered by this straight portion 146 becomes, the wider the control range for wavelength becomes. In other words, it is preferred with such film reflection factor as bringing the shape of the graph into a triangle waveform. It is hard to alter the material for the etalon, the thickness thereof and the film reflection factor thereof, once they are determined for production. Thus, adjustment is performed to conform a particular wavelength to the straight portion 146 as mentioned above by changing the incident angle of the beam with regard to the etalon or the temperature of the etalon. However, it is general to control the wavelength of the semiconductor laser by subjecting the same to temperature change, and performing temperature control separately for the laser and the etalon within the optical communication module complicates the arrangement, which is not practical after all. Thus, it is general to adjust the temperature of the laser so as to control wavelength after the adjustment and fixing of the incident angle of the beam with regard to the etalon have been over.

Figure 5:
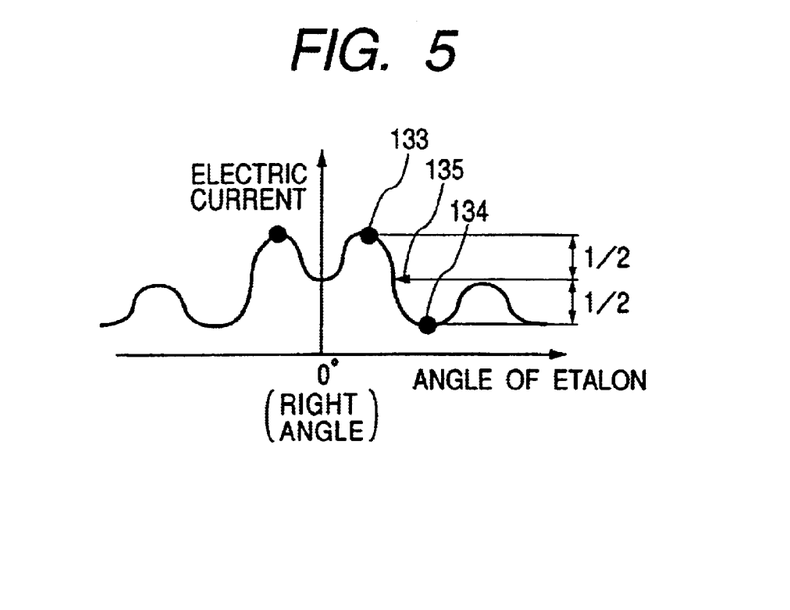
FIG. 5 is a diagram to show the relation between the incident angle of the light beam penetrating into the etalon and the transmitted quantity of light thereof.

FIG. 5 is a diagram to show the relation between the incident angle of the light beam with regard to the etalon and the quantity of the transmitted light, the horizontal axis of which indicates the incident angle of the light beam with regard to the etalon while the vertical axis of which indicating an electric current converted from the quantity of the transmitted light at the light receiving device. This diagram takes an angle of the plane of incidence of the penetrated beam with regard to the etalon as change of degree from a right angle, which diagram shows the relation between the incident angle of the light beam with regard to the etalon and the electric current (the largeness of the quantity of light). The change of the angle of the etalon in the vicinity of a right angle with regard to the light beam allows a first peak current 133 and a first bottom current 134 to be detected without fail. For instance, the angle of the etalon is fixed at 135 that corresponds to one half of the interval between the currents as mentioned above. While keeping this state, changing a wavelength leads to the relation between the electric current 131 and wavelength as shown in FIG. 3, and a wavelength locking current 136 corresponding to practically the middle of the electric current curve 131 is controlled at wavelength fixing point 132 so that the locking current becomes constant, with the result that a wavelength is constantly stabilized. Practically speaking, the angle of the etalon 135 at which a wavelength is locked changes from the right angle with regard to the beam within the range of the order of 0.8 to 2.8 degree as to an etalon having the spacing of 100 GHz and within the range of the order of 0.6 to 2.0 degree as to an etalon having the spacing of 50 GHz. In this way, the angle of the etalon changes according to a target wavelength, the fixing precision of which angle shall be within the range of ±0.1 to 0.2 degree.

Then, the method for adjusting and fixing the incident angle of the beam with regard to the etalon with the precision as mentioned above is compared with reference to FIGS. 6 through 8. The laser beam emitted from the semiconductor laser 11 turns to become a beam 20a slightly diffused by a lens 12 or practically parallel beam 20, which beam transmits through the etalon 14 and then is penetrated into the first light receiving device 15 or light receiving devices 15a and 15b to detect wavelength fluctuation, which arrangement is common in the respective drawings.

Figure 6:
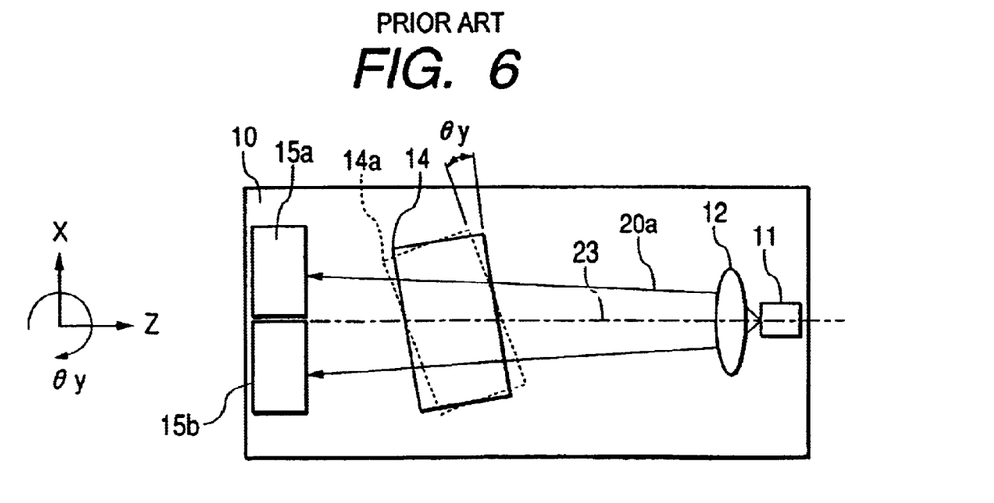
FIG. 6 is a plan view to show a mechanism that adjusts the incident angle of the light beam with regard to the etalon in the prior optical communication module.

FIG. 6 is a plan view to show the mechanism for adjusting the incident angle of the light beam with regard to the etalon in the conventional optical communication module, which view schematically shows the featured elements of the module as disclosed in the Japanese Patent Application Laid-open No. Hei 10-079723 as mentioned above. In this prior art, the incident angle of the beam with regard to the etalon is adjusted by rotating the etalon in plane. That is, it is arranged such that the incident angle of the beam 20a as diffused by the lens 12 is adjusted by rotating the etalon 14 indicated with a solid line in the direction of θy so as to direct the same into the angle of the etalon 14a indicated with a dotted line, according to which incident angle, the balance of optical output from the first light receiving devices 15a and 15b to detect wavelength fluctuation is adjusted. As such, the method for adjusting the incident angle of the beam with regard to the etalon by rotating the etalon in the direction of θy is of public domain.

On the contrary, it is also feasible in principle to adjust wavelength fluctuation by adjusting the absolute value of the optical output of the sole light receiving device instead of the first light receiving devices 15a and 15b to detect wavelength fluctuation. This arrangement is discussed below centering on the method for adjusting the incident angle of the beam with regard to the etalon and the precision thereof.

Figure 7:
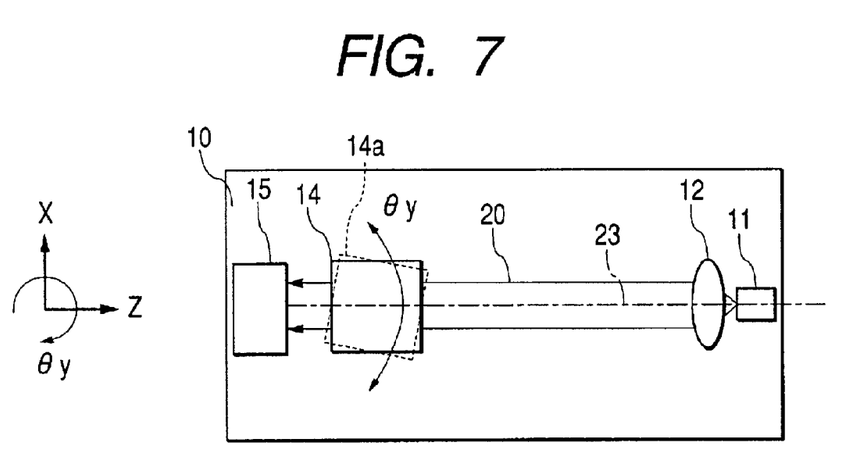
FIG. 7 is a plan view to show a mechanism that adjusts the incident angle of the light beam with regard to an etalon by rotating the etalon in plane.

FIG. 7 is a plan view to explain the mechanism for adjusting the incident angle of the beam with regard to the etalon by rotating the etalon in plane. In FIG. 7, it is arranged such that a lens 12 is fixed at first and the etalon 14 indicated with a solid line is rotated in the direction of èy so as to adjust the incident angle as represented by the angle of the etalon 14a indicated with a dotted line. For instance, provided that the etalon 14 has 1 mm in width, it requires such high precision of micron order for the fixing of both sides of the etalon by the rotation thereof in the direction of èy as expressed in 1000×tan 0.1°=1.7 ìm to change the incident angle by 0.1 degree.

Figure 8:
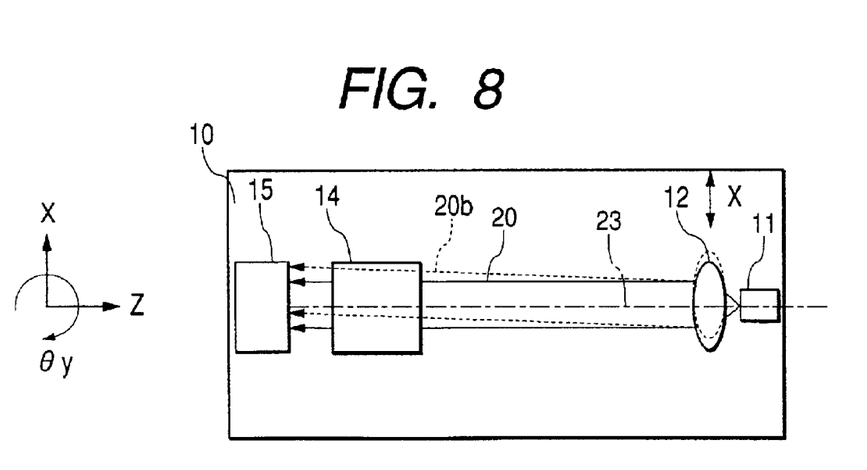
FIG. 8 is a plan view to show a mechanism that adjusts the incident angle of the light beam with regard to the etalon by moving a lens.

FIG. 8 is a plan view to explain the mechanism for adjusting the incident angle of the beam with regard to the etalon by moving the lens. In FIG. 8, it is arranged such that the etalon is fixed at first and the lens 12 is moved vertically with regard to the optical axis or in the direction of X as shown in the drawing so as to turn the beam 20 indicated with a solid-line into a beam 20b indicated with a dotted line, which allows the incident angle of the beam with regard to the etalon 14 to be adjusted. For instance, provided that the focal length of the lens 12 is expressed with f=1 mm, it requires such high precision of micron order for the fixing of the lens as expressed in 1000×tan 0.1°=1.7 ìm to change the incident angle by 0.1 degree.

In the above methods, it requires the precision of micron order for the fixing of the etalon or the lens. It is the arrangement as shown in FIG. 1 that relaxes the fixing precision as mentioned above. The present invention is to provide a mechanism for finely adjusting the incident angle of the beam with regard to the etalon wherein the change of the rotational angle of the etalon or the moving length of the lens does not directly lead to the change of the incident angle of the light beam with regard to the etalon, rather, the change of the incident angle of the light beam with regard to the etalon is relatively smaller than that of the rotational angle or moving length as mentioned above.

In FIG. 1, it is arranged such that the lens 12 is fixed at first and an etalon 14b whose plane of incidence is inclined by â with regard to a vertical plane of an etalon rotational axis 27 that is inclined by á with regard to an optical center axis 23 of the lens is rotated around the rotational axis 27 by à so as to adjust the incident angle of the beam as shown in an etalon 14c indicated with a dotted line. For instance, when an etalon 14b whose plane of incidence is inclined by â=1.5 degree with regard to the vertical plane of the axis 27 that is inclined by á=2 degree with regard to the optical axis 23 is rotated around the axis 27 by è, the incident angle of the beam with regard to the etalon 14b can be adjusted within the range of á±â=2±1.5° under the condition that á is larger than â or equal to â within the range of 0.5 to 3.5°. Under the condition of á<â, the incident angle can be adjusted within the range of (â−á) to (á+â). That is to say, the rotation of the etalon 14b in the direction of è by ±180° allows the incident angle of the beam to be changed by ±1.5°. The rotational angle precision of the etalon in the direction of è can be largely relaxed to achieve the fixing precision within the incident angle of ±0.1 to 0.2° as mentioned above. At the practical adjusting and fixing operation of the etalon 14b, in many cases, the etalon is rotated by in the direction of è by holding the same with a two-clawed chuck. Thus, the range within which to enable the etalon to rotate in the direction of è at one grasp without changing hands facilitates the same operation as mentioned above. In this case, the rotational range of the chuck in the direction of è, considering the interference between the chuck claws and the substrate 10, is generally preferred with the range of the order of ±45°. Thus, the rotational range of the etalon in the direction of è being restricted to ±45° from ±180° and the angle of â being enlarged from 1.5° to 6° while the angle of á being defined as 6° to satisfy the condition that á is larger than â or equal to â, the incident angle of the beam is defined as á±â=6±6°, a portion of the variable range of which incident angle is put to practical use. The rotational angle precision of the etalon in the direction of è is estimated to be of the order of ±180°×0.1°=±3° to achieve the fixing precision of the etalon corresponding to the incident angle ±0.1° of the beam with regard to the etalon, which leads to the large relaxation of the rotational angle precision of the etalon. To sum up, the forgoing arrangement is such that the etalon 14b is rotated in the direction of è so as to be adjusted at the angle 135 of the etalon as shown in FIG. 5 and be easily tuned to a specific wavelength as defined by the ITU as described above.

Figure 9:
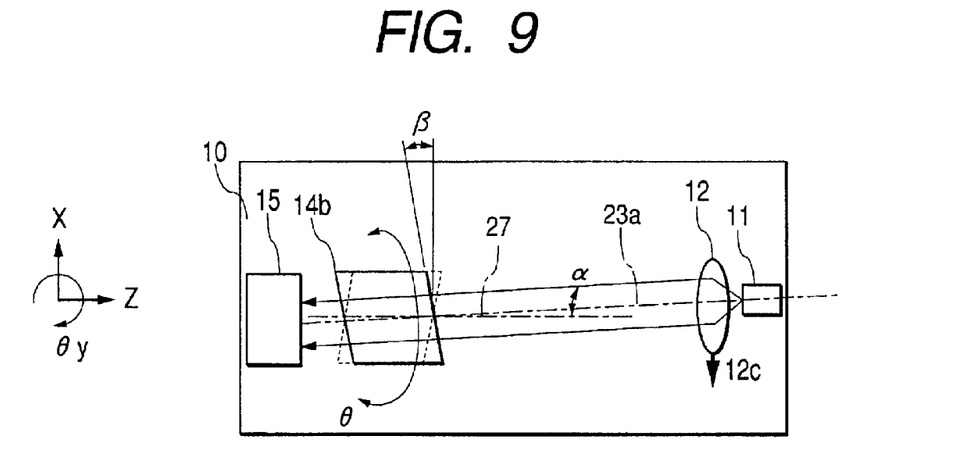
FIG. 9 is a plan view to show the optical communication module of the second embodiment according to the present invention.

FIG. 9 is a plan view to show the second embodiment of the optical communication module according to the present invention. The module as shown in FIG. 9 is arranged such that a lens 12 is offset by 12c for fixing with regard to a semiconductor laser 11 and an optical axis center 23 of the lens is listed by á so as to make a etalon rotational axis 27 parallel to a Z coordinate system of the module. The plane of incidence of the etalon 14b is inclined by â with regard to the vertical plane of the etalon rotational axis 27, and the adjusting mechanism of the incident angle of the beam with regard to the etalon is the same as shown in FIG. 1. The present arrangement in which the lens 12 is offset by 12c so as to define the angle á, which allows the etalon rotational axis 27 to go in parallel to an edge surface of a substrate 10 and a Z coordinate axis of the module, is more suitable in view of the structural point of view for the substrate 10 and the module.

Figure 10:
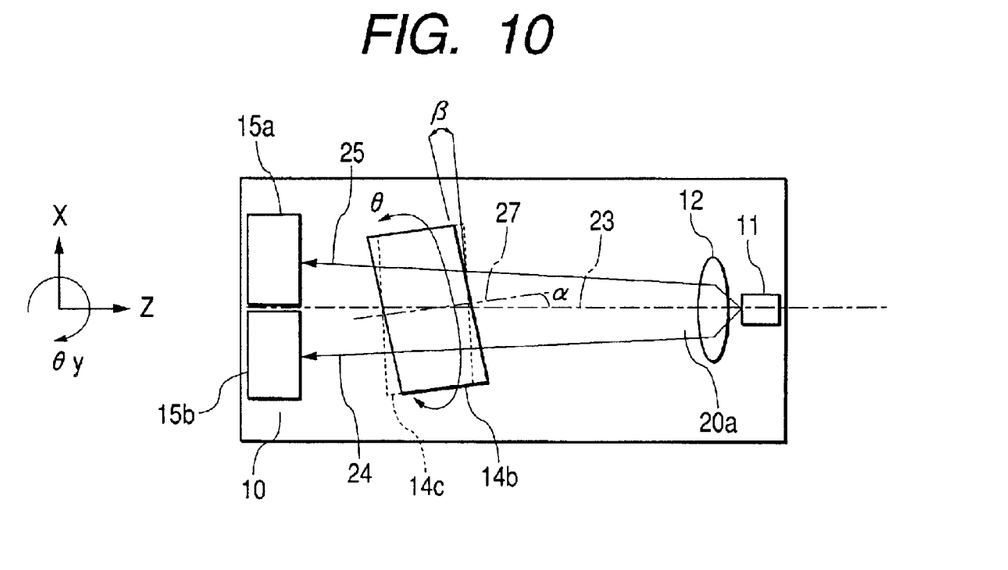
FIG. 10 is a plan view to show the optical communication module of the third embodiment according to the present invention.

FIG. 10 is a plan view to show the third embodiment of the optical communication module according to the present invention. This module is arranged such that the arrangement as shown in FIG. 1 is applied to that shown in FIG. 6. It is arranged such that an etalon 14b whose plane of incidence is inclined by á with regard to the vertical plane of the etalon rotational axis 27, which rotational angle is inclined by á with regard to the optical axis center of the lens 23 that is the center of the beam 20a as diffused by the lens 12, is rotated by è around the rotational axis 27 so as to adjust the incident angle of the beam with regard to the etalon within the range of the etalon 14c indicated with a dotted line. This allows the rotational angle precision of the etalon in the direction of è to be relaxed in comparison with the same precision in the direction of èy as shown in FIG. 6.

Another embodiment wherein the rear beam is split by a beam splitter is described with reference to FIG. 11.

Figure 11:
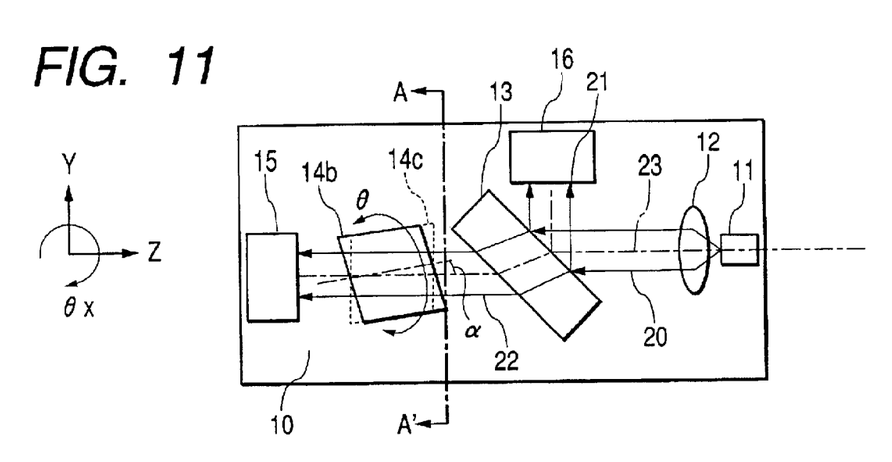
FIG. 11 is a plan view to show the optical communication module of the fourth embodiment according to the present invention.

FIG. 11 is a plan view to show the fourth embodiment of the optical communication module according to the present invention. FIG. 11 shows the laser beam emitted rearwards from the semiconductor laser 11 turned into a parallel beam 20 at a rear lens 12 and further at a plane type beam splitter 13, on the one side of which a half mirror is provided, divided into a beam splitter reflection beam 21 and a beam splitter transmission beam 22. The beam splitter reflection beam 21 is penetrated into a second light receiving device 16 to receive the quantity of laser beam. On the other hand, following that the beam splitter transmission beam 22 is transmitted through an etalon 14b, it is penetrated into a first light receiving device 15 to detect wavelength fluctuation. In the present embodiment, it is arranged such that the laser beam is divided by the plane type beam splitter 13 so as to be penetrated into the respective light receiving devices 15 and 16, but as for the beam splitter transmission beam 22, the same adjusting mechanism as shown in FIG. 1 is also applicable and that the rotational axis of the etalon 14b is inclined by a with regard to the Z coordinate axis and the etalon 14b is rotated in the direction of è so as to be adjusted at the angle 135 of the etalon as shown in FIG. 5 and be tuned to a specific wavelength as defined by the ITU as mentioned above. This embodiment shows an example in which the plane type beam splitter 13 is put to use, but it works in the same way also by means of a cube type beam splitter, on the half mirror side of which two right angle isosceles triangle prisms are attached.

Here, a typical example for mounting an etalon by rotating and fixing the same is concretely explained below with reference to FIGS. 12 and 13 that are the perspective views taken along the line A-A' of FIG. 11.

Figure 12:
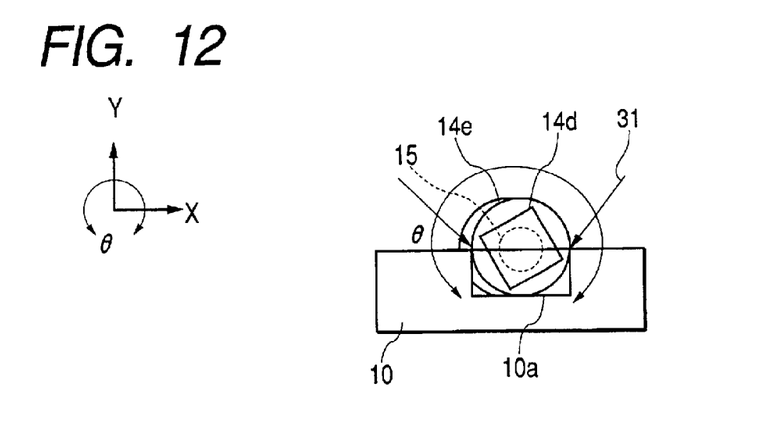
FIG. 12 is a side view of the etalon taken along the line A-A' of FIG. 11 to show one example of the mounting structure of the etalon.

FIG. 12 is a side view showing one example of the mounting structure of an etalon taken along the line A-A' of FIG. 11. In this example, laser spot welding is performed on the etalon 14b for fixing. A groove 10a is concavely ditched into the substrate 10. The square-shaped etalon 14b is preliminarily fixed through soldering, low-melting glass sealing or compression into a cylindrical etalon case 14e made from SUS 430 or Kovar. Then, the etalon case is rotated in the direction of è so as to adjust the angle of the etalon as desired. Subsequently, spot welding is performed on the etalon case and the edge portion of the groove 10a for fixing.

Figure 13:
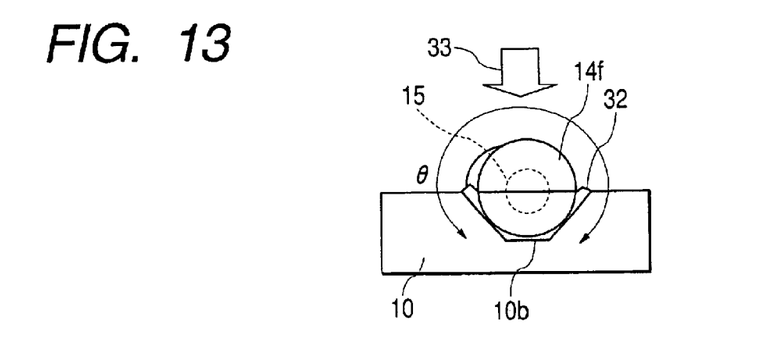
FIG. 13 is a side view of the etalon taken along the line of A-A' of FIG. 11 to show another example of the mounting structure of the etalon.

FIG. 13 is a side view showing another example of the mounting structure of the etalon taken along the line A-A' of FIG. 11. In this embodiment, soldering operation is performed on the etalon. A V-shaped groove 10b is wedged into the substrate 10. An etalon 14f, which is formed into a cylindrical shape and on the outer circumferential surface of which metallization is performed for soldering, is rotated in the direction of è so as to be adjusted at an angle as desired for fixing. Thereafter, fusing operation by means of beam heating 33 and so forth is performed on a solder 32 for fixing.

The foregoing embodiments relate to the method for rotating an etalon in the vicinity of an optical axis for adjustments. Then, another example is described below with reference to FIG. 14 wherein an etalon is fixed at first and the incident angle of the beam with regard to the etalon is adjusted by rotating a lens and so forth around the optical axis.

Figure 14:
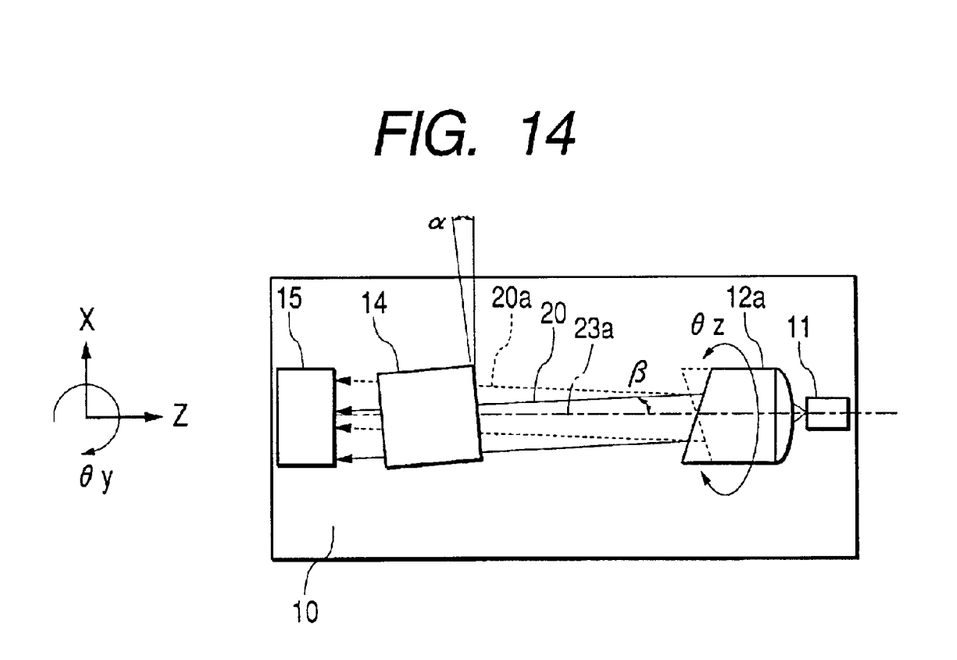
FIG. 14 is a plan view to show the fifth embodiment of the optical communication module according to the present invention.

FIG. 14 is a plan view to show the fifth embodiment of the optical communication module according to the present invention wherein a GRIN (Graded-Index) lens, the edge surface of which is obliquely ground, is rotated around the optical axis. It is arranged such that an etalon 14 is firstly fixed by inclining the same by á with regard to a plane intersecting with the central axis 23a of the GRIN lens 12a, the edge surface of which is obliquely ground and the GRIN lens 12a is then rotated around the optical axis or in the direction of èz so as to swing a beam indicated with a solid line over to a beam 20a indicated with a dotted line, which allows the incident angle of the beam with regard to the etalon to be adjusted. For instance, where a GRIN lens 12a, the edge surface of which is ground by 3° obliquely with regard to the optical axis of the lens, is put to use, assuming that the refractive index of the optical axis center of the lens is 1.5, the refraction angle â of the beam with regard to the central axis of the lens 23a is found by 1.5×sin 3°=sin (3°+â) according to Snell's law, which angle becomes approximately 1.5 degree. On the other hand, when the etalon 14 is fixed by inclining by á=2° with regard to the plane thereof intersecting with the central axis of the lens 23, and then a GRIN lens 12a whose edge surface is ground obliquely with regard to the optical axis is rotated by 360° around the central axis 23a or in the direction of èz, the incident angle of the beam with respect to the etalon 14 can be adjusted within the range of á×±â=2±1.5°. In the same way as the above method for rotating the etalon in the vicinity of the optical axis, this embodiment allows the rotational angle precision of the lens in the direction of èz to be relaxed.

Then, with reference to FIG. 15, another embodiment wherein a second light receiving device to receive the quantity of laser beam is added is described below.

Figure 15:
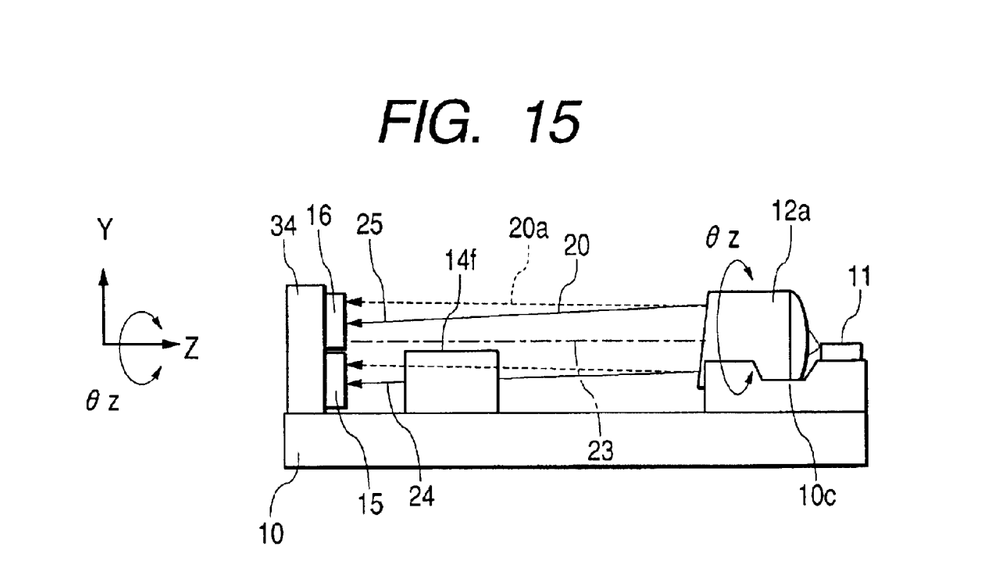
FIG. 15 is a side view to show the sixth embodiment of the optical communication module according to the present invention.

FIG. 15 is a side view to show the sixth embodiment of the optical communication module according to the present invention. This example is arranged such that an etalon 14f is firstly fixed by slightly inclining in the direction of èy with regard to the Z coordinate axis, and a GRIN lens 12a whose edge surface is ground obliquely is then rotated around the optical axis or in the direction of èz so as to turn a beam 20 indicated with a solid line into a beam 20a indicated with a dotted line and adjust the incident angle of the beam with regard to the etalon 14f. A beam 25 that is a portion of the parallel rear beam 20 is directly penetrated into a second light receiving device 16 to receive the quantity of the laser beam while the remaining beam 24 thereof is transmitted through the etalon 14f and then penetrated into a second light receiving device 15 to detect wavelength fluctuation.

Here, a typical example of the mounting structure of the GRIN lens 12a, the edge surface of which is obliquely ground, by way of rotating and fixing the same is described below. A semiconductor laser 11 is fixed through soldering and so forth onto a lens table 10c, which is made from a Si substrate and a portion of which is etched to form a V groove. Then, the etalon 14f, the first and second light receiving devices 15 and 16 are fixed onto the substrate 10. Lastly, the GRIN lens 12a, on the outer circumferential surface of which metallization is performed for soldering, is rotated in the direction of èz for adjustment and is soldered into the V groove of the lens table 10c. In view of the foregoing, the present invention is also workable in the aspect of mounting the featured elements thereof. The vertical disposition of the first and second light receiving devices 15 and 16, which are disposed in the Y direction, advantageously allows the quantity of the beam 20 to be divided into an etalon transmission beam 24 and a beam 25 without being affected by the fixing position of the etalon 14f.

Hereinafter, the arrangement in which the first and second light receiving devices as shown in FIG. 15 are horizontally disposed is described below with reference to FIG. 16.

Figure 16:
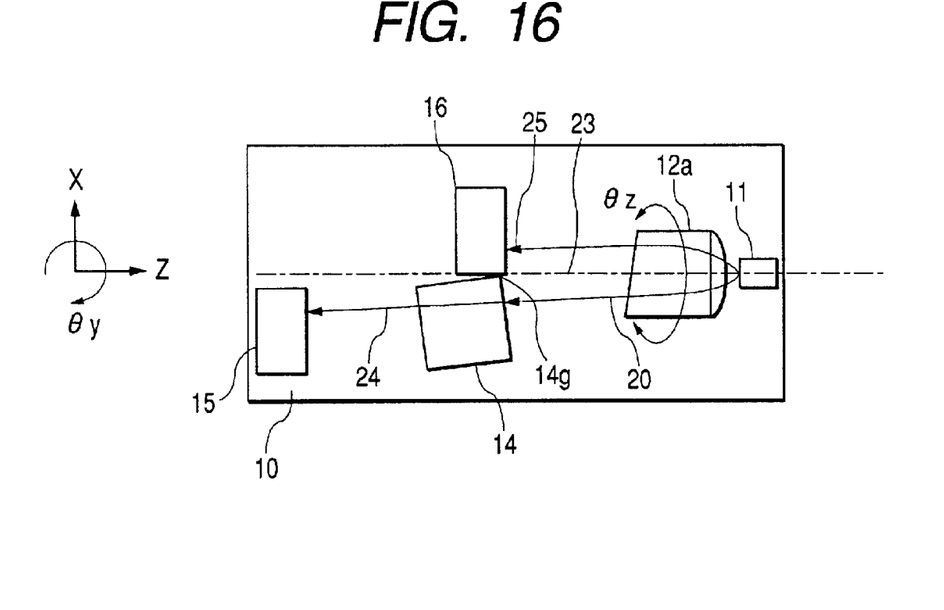
FIG. 16 is a plan view to show the seventh embodiment of the optical communication module according to the present invention.

FIG. 16 is a plan view to show the seventh embodiment of the optical communication module according to the present invention. A beam 25 that is a portion of the rear beam 20 is directly penetrated into the second light receiving device 16 to receive the quantity of the laser beam while the remaining portion of the beam 24 is transmitted through the etalon 14 and penetrated into the first light receiving device 15 to detect wavelength fluctuation. The difference between the sixth and the present embodiment, basically, lies in the splitting direction of the beam, but this embodiment allows the fixing position of the second light receiving device 16 to receive the quantity of the laser beam to be more freely selected. Concretely speaking, it requires that the disposition of the second light receiving device 16 should be contrived in order to avoid the influence of the diffracted light of the beam 20, which light is generated at an edge 14g of the etalon 14. Where the first and second light receiving devices 15 and 16 are vertically disposed as shown in FIG. 15, the devices as disposed on a substrate 34 and so forth are hard to be adjusted in the Y direction so as to be mainly adjusted in the Z direction. In turn, the present embodiment is advantageous to adjust those devices in the X and Z directions. As described above, the direction in which the first and second light receiving devices 15 and 16 are disposed may be selected according to the purpose for working the invention, which it should be appreciated does not hamper from working the present invention.

Then, another embodiment in which both the lens and the etalon are fixed is described below with reference to FIGS. 17 and 18.

Figure 17:
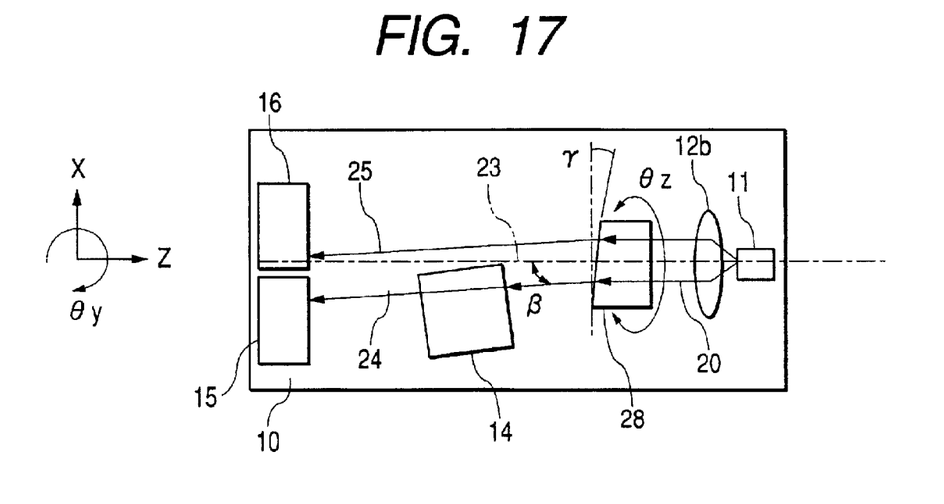
FIG. 17 is a plan view to show the eighth embodiment of the optical communication module according to the present invention.

FIG. 17 is a plan view to show the eighth embodiment of the optical communication module according to the present invention. The present embodiment is characterized in that such lens whose edge surface is hard to be obliquely ground as a spherical ball lens or an aspherical lens is adopted for the GRIN lens 12b whose edge surface is obliquely ground and as shown in FIG. 14. The present embodiment as shown in FIG. 17 comprises a lens 12b whose edge surface is hard to be diagonally ground such as a spherical lens or an aspherical lens and a wedge substrate 28, instead of the GRIN lens 12a whose edge surface is obliquely ground and as shown in FIG. 14. The laser beam is turned into a parallel beam 20 at a lens 12b, which beam is transmitted through a wedge substrate 28. The angle of the beam 20 is bent by a degree on the basis of an inclination angle â along an emitting side plane and a refractive index of the substrate 28. Thereafter, in the same way as shown in FIG. 16, a portion 25 of the beam 20 is directly penetrated into the second light receiving device 16 to receive the quantity of the laser beam while the remaining portion 24 of the beam 20, which transmits through the etalon, is penetrated into the first light receiving device 15 to detect wavelength fluctuation. The incident angle of the beam with regard to the etalon 14 is arranged to tune a specific wavelength defined by the ITU as mentioned above by rotating only the wedge substrate 28 in the direction of èz so as to swing the beam with regard to the etalon 14 and adjust the beam to a target fixed angle of the etalon.

Then, another example in which the rear beam is split by a beam splitter is described below.

Figure 18:
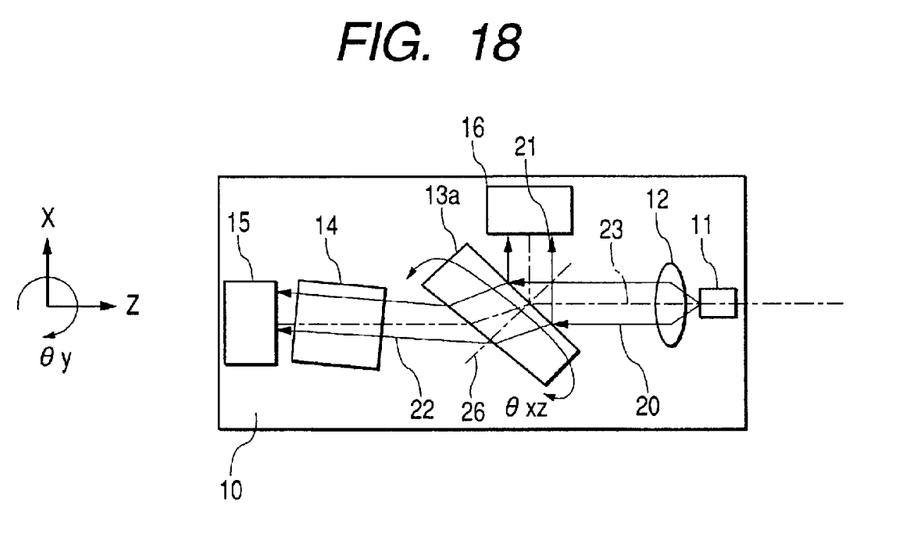
FIG. 18 is a plan view to show the ninth embodiment of the optical communication module according to the present invention.

FIG. 18 is a plan view to show the ninth embodiment of the optical communication module according to the present invention. This embodiment is arranged to split a rear beam with a beam splitter in the same way as the example as shown in FIG. 11, but herein a wedge type beam splitter 13a is adopted for the beam splitter. The laser beam emitted rearwards from the semiconductor laser 11 is turned into a parallel beam 20 at a rear lens 12, which beam is then divided into a beam splitter reflection beam 21 and a beam splitter transmission beam 22 at the wedge type beam splitter 13a, on the one side surface of a half mirror is provided. The reflection beam 21, in the same way as the example as shown in FIG. 11, is penetrated into the second light receiving device to receive the quantity of the laser beam while the angle of the transmission beam 22 is bent on the basis of a wedge inclination angle and a refractive index of the beam splitter 13a, which beam 22 is then transmitted through the etalon 14 so as to be penetrated into the first light receiving device 15 to detect wavelength fluctuation. The incident angle of the transmission beam 22 is adjusted with regard to the etalon 14 by rotating the beam splitter 13a centering the rotational axis of XZ 26 in the direction of èxz so as to tune a specific wavelength defined by the ITU. In the present embodiment, the use of the wedge type beam splitter 13a is exemplified, but the arrangement in which the wedge substrate is rotated at the emission side of the transmitted light through a cube type beam splitter also facilitates the incident angle adjustment of the beam in the same way as the present embodiment.

In the above embodiments, an etalon is provided with a plane of incidence and a plane of emission substantially in parallel to each other and at least one lateral plane between the planes of incidence and emission, which etalon is fixed on a substrate such that the lateral plane has an angle of o degree or more with the substrate. For instance, an etalon is cylindrically shaped, the planes of incidence and emission of which etalon are substantially parallel to each other while the lateral surface of which is cut out into a lateral plane, through which plane the etalon is fixed onto the substrate. A member to maintain the angle between the lateral plane and the substrate may be provided between the etalon and the substrate. This member and the etalon are soldered together, or metallization for soldering may be performed on this lateral plane. Moreover, the plurality of lateral planes may be provided with the etalon.

Further, the markings are provided with the etalon, on the basis of which markings the etalon may be integrated into the substrate. Likewise, the markings may be also provided with the substrate for the positioning between the etalon and the substrate.

As described above, the present invention, in the wavelength monitoring optical system wherein the repetitive wavelength selectivity of an etalon allows the plurality of different wavelengths to be detected, enables the incident angle of the laser beam with regard to the etalon to be adjusted and fixed with high precision by rotating an etalon having an inclined plane of incidence with regard to the rotational axis thereof around the rotational axis thereof in the vicinity of the optical axis or rotating a lens whose edge surface is obliquely ground around the optical axis so as to change and adjust the incident angle of the beam with regard to the etalon. This prevents a monitored wavelength from being displaced from the ITU grid so as to provide an optical communication module that improves production process yield.

The present invention may be embodied in other specific forms without departing from the spirit or essential characteristics thereof. The present embodiments are therefore to be considered in all respects as illustrative and not restrictive, the scope of the invention being indicated by the appended patent claims rather than by the foregoing description and all changes that come within the meanings and range of equivalency of the claims are therefore intended to be embraced therein.

What is claimed is:

1. An optical communication module, comprising:
a semiconductor laser,
a lens to convert a beam emitted from said semiconductor laser,
a wavelength selective filter of the beam as converted, and
a light receiving device to receive the beam transmitted through the filter,
wherein said filter is shaped in a pillar-shape and is provided with a plane of incidence and a plane of emission substantially in parallel to each other, and said filter is fixed on a substrate in such a manner as a central line of the pillar-shape is inclined by $\alpha$ degrees that is larger than 0 degrees with regard to a central axis of said lens, and there is an angle $\beta$ degrees above 0 degrees between the central line of the pillar-shape and of the plane of incidence, or between the central line of the pillar-shape and the plane of emission.

2. An optical communication module according to claim 1 wherein said filter is provided with at least one lateral plane between said planes of incidence and emission, and wherein a retaining member to maintain an angle between said lateral plane and said substrate is provided between said filter and said substrate.

3. An optical communication module according to claim 1 wherein a plurality of lateral planes is provided with the filter.

4. An optical communication module according to claim 1, wherein the pillar-shape is a cylinder.

5. An optical communication module according to claim 1, wherein said filter is fixed on the substrate such that a side of the pillar-shape and the substrate have an angle of 0 degrees or more therebetween.

6. An optical communication module, comprising:
a substrate,
a semiconductor laser,
a lens to convert a beam emitted from said semiconductor laser,
a wavelength selective filter of the beam as converted, and
a light receiving device to receive the beam transmitted through the filter,
wherein said filter is provided with a plane of incidence and a plane of emission substantially in parallel to each other and at least one lateral plane between said planes of incidence and emission, wherein said filter is fixed on the substrate such that said lateral plane and substrate have an angle of 0° or more therebetween.
wherein a retaining member to maintain an angle between said lateral plane and said substrate is provided between said filter and said substrate, and
wherein said retaining member and said filter are soldered together.

7. An optical communication module according to claim 6 wherein metallization is performed on said lateral plane for soldering.

8. An optical communication module, comprising:
a substrate,
a semiconductor laser,
a lens to convert a beam emitted from said semiconductor laser,
a wavelength selective filter of the beam as converted, and
a light receiving device to receive the beam transmitted through the filter,
wherein said filter is provided with a plane of incidence and a plane of emission substantially in parallel to each other and at least one lateral plane between said planes of incidence and emission, wherein said filter is fixed on the substrate such that said lateral plane and substrate have an angle of 0° or more therebetween,
wherein a marking is provided on the filter for position setting.

9. An optical communication module, comprising:
a substrate,
a semiconductor laser,
a lens to convert a beam emitted from said semiconductor laser,
a wavelength selective filter of the beam as converted, and
a light receiving device to receive the beam transmitted through the filter,
wherein said filter is provided with a plane of incidence and a plane of emission substantially in parallel to each other and at least one lateral plane between said planes of incidence and emission, wherein said filter is fixed on the substrate such that said lateral plane and substrate have an angle of 0° or more therebetween,
wherein the filter is disposed on the substrate and a marking is provided on said substrate for positioning with the filter.

10. A method for manufacturing an optical communication module that includes a semiconductor laser, a lens to convert a beam emitted from said semiconductor laser, a wavelength selective filter of the beam as converted, wherein said filter is shaped in a pillar-shape and wherein a plane of incidence and a plane of emission of which filter are substantially parallel to each other, and a light receiving device to receive the beam transmitted through said filter, said method comprising the steps of:
disposing the filter such that a rotational axis of said filter has an angle with regard to an optical axis of the beam emitted from the lens;
pivoting said rotational axis so as to adjust an incident angle of the beam with regard to the filter in such a manner as a central line of the pillar-shape is inclined by α degrees that is larger than 0 degrees with regard to a central axis of said lens, and there is an angle β degrees above 0 degrees between the central line of the pillar-shape and of the plane of incidence, or between the central line of the pillar-shape and the plane of emission; and
fixing the filter at a position where said incident angle is adjusted.

11. A method for manufacturing an optical communication module according to claim 10 wherein a side-slope of a plane of incidence of the filter is inclined with regard to said rotational axis.

12. A method for manufacturing an optical communication module according to claim 10 wherein at the step of adjusting the incident angle of the beam with regard to the filter, said filter is rotated around a center of the optical axis of the beam emitted from the semiconductor laser or a line parallel with regard to said optical axis.

13. A method for manufacturing an optical communication module that includes a semiconductor laser, a lens to convert a beam emitted from said semiconductor laser, a wavelength selective filter of the beam as converted, wherein said filter is shaped in a pillar-shape and wherein a plane of incidence and a plane of emission of which filter are substantially in parallel to each other, an a light receiving device to receive the beam transmitted through the filter, said method comprising the steps of:
disposing the filter by inclining the side-slope of the plane of incidence by an angle with regard to the optical axis of the beam;
rotating said filter around an axis different from a slope of said plane of incidence so as to adjust an incident angle of the beam with regard to said filter in such a manner as a central line of the pillar-shape is inclined by α degrees that is larger than 0 degrees with regard to a central axis of said lens, and there is an angle β degrees above 0 degrees between the central line of the pillar-shape and of the plane of incidence, or between the central line of the pillar-shape and the plane of emission; and
fixing said filter at a position where said incident angle is adjusted.

14. A method for manufacturing an optical communication module according to claim 13 wherein at the step of adjusting the incident angle of the beam with regard to the filter, said filter is rotated around a center of the optical axis of the beam emitted from the semiconductor laser or a line parallel with regard to said optical axis.

15. A method for manufacturing an optical communication module that includes a semiconductor laser, a lens to convert a beam emitted from said semiconductor laser, a wavelength selective filter of the beam as converted, wherein a plane of incidence and a plane of emission of which filter are substantially parallel to each other, and a light receiving device to receive the beam transmitted through said filter, said method comprising the steps of:
disposing the filter such that a rotational axis of said filter has an angle with regard to an optical axis of the beam emitted from the lens;
pivoting said rotational axis so as to adjust an incident angle of the beam with regard to the filter; and
fixing the filter at a position where said incident angle is adjusted,
wherein at the step of adjusting the incident angle of the beam with regard to the filter, said filter is rotated around a center of the optical axis of the beam emitted from the semiconductor laser or a line parallel with regard to said optical axis, and
wherein a center of the lens is offset vertically against the center of the optical axis of the beam emitted from the semiconductor laser.

* * * * *